United States Patent [19]

Perry

[11] Patent Number: 4,720,900
[45] Date of Patent: Jan. 26, 1988

[54] METHOD OF INSTALLING A FUEL PUMP

[76] Inventor: Oliver L. Perry, P.O. Box 1632, High River, Alberta, Canada, TOL 1B0

[21] Appl. No.: 886,173

[22] Filed: Jul. 16, 1986

[51] Int. Cl.$^4$ ............................ B23P 15/00; B23P 7/00
[52] U.S. Cl. ................................. 29/156.4 R; 29/270; 29/402.08; 411/378; 411/386; 411/424
[58] Field of Search ................. 29/156.4 R, 402.01, 29/402.03, 402.08, 428, 434, 559, 281.1, 270; 411/378, 386, 411, 424

[56] References Cited

U.S. PATENT DOCUMENTS

| 3,259,967 | 7/1966 | Marsicano | 29/402.08 X |
| 3,330,177 | 7/1967 | Oliver | 411/424 |
| 3,829,163 | 8/1974 | Hans | 411/386 X |

FOREIGN PATENT DOCUMENTS

| 2815247 | 10/1979 | Fed. Rep. of Germany | 411/386 |
| 19448 | 1/1915 | France | 411/386 |
| 1505530 | 11/1967 | France | 411/386 |
| 1885 | of 1858 | United Kingdom | 411/386 |
| 2058990 | 4/1981 | United Kingdom | 411/386 |

Primary Examiner—P. W. Echols
Assistant Examiner—Ronald S. Wallace
Attorney, Agent, or Firm—Brady, O'Boyle & Gates

[57] ABSTRACT

An existing bolt on certain V-8 engines near and laterally inwardly of the engine fuel pump is aligned with the fuel pump push rod driven by the engine cam shaft. When installing a new fuel pump, the existing bolt is removed and a push rod holding screw of sufficient length to engage and hold the fuel pump push rod is temporarily installed in the threaded opening previously accommodating the removed bolt. The holding screw is turned manually until it engages the fuel pump push rod to hold the push rod elevated while the fuel pump is being installed. The procedure assures that the push rod will be in proper operative engagement with the fuel pump arm when the fuel pump installation is completed, following which the push rod holding screw is removed and the bolt is reinstalled in the threaded opening of the engine block. Haphazard and unreliable methods of holding the push rod up during the fuel pump installation with table knives, screwdrivers and a variety of crude tools are fully avoided. The push rod holding screw positions the push rod with precision consistently.

2 Claims, 4 Drawing Figures

METHOD OF INSTALLING A FUEL PUMP

BACKGROUND OF THE INVENTION

Technical Field

The present invention relates to a device which facilitates replacing the fuel pump on V-8 gasoline engines manufactured by General Motors Corporation, and more particularly relates to a device and method for holding up the fuel pump push rod connected with the engine cam shaft while a fuel pump is being installed to assure proper operating engagement of the push rod with the fuel pump arm.

Prior Art

In the prior art, mechanics required to replace fuel pumps on General Motors V-8 gasoline engines manufactured from 1955 to the present time have resorted to haphazard and somewhat inconvenient means for holding the fuel pump push rod elevated while the new fuel pump is being installed on the engine. These haphazard means range from screwdrivers to bent table knives, hacksaw blades, bent feeler gages, and strips of metal. These devices are inserted between the engine block and fuel pump to engage beneath the push rod and hold it up. If the push rod falls during the pump installation procedure, and this sometimes occurs, the push rod driven by the cam shaft cannot engage and operate the fuel pump arm and therefore the pump will not operate, and the entire installation procedure must be repeated. Sometimes, heavy grease is utilized beneath the push rod to hold it up but if the engine is hot, this method frequently does not work successfully.

It is therefore the primary object of the present invention to eliminate the drawbacks and inconvenience of the prior art through provision of a very simplified device and method for engaging and holding the fuel pump push rod at the proper elevation while a fuel pump is being installed, and thus assuring proper operative engagement of the push rod with the fuel pump arm when the pump installation is completed.

A further object of the invention is to take advantage of the location of an existing bolt in the engine block near the fuel pump, which bolt is in alignment with the fuel pump push rod; the invention involving the removal of the existing bolt and temporarily installing in its place a push rod holding screw of sufficient length to make solid contact with the push rod and hold the latter up by friction while the fuel pump is being installed, after which the holding screw is removed and replaced by the previously removed bolt. The procedure is very simple, highly convenient and consistently precise, because the holding screw is always in accurate alignment with the push rod so that it can engage one side of the push rod when the holding screw is manually turned in the threaded opening of the engine block.

Other objects and advantages of the invention will become apparent to those skilled in the art during the course of the following detailed description.

DETAILED DESCRIPTION

Figure 1:
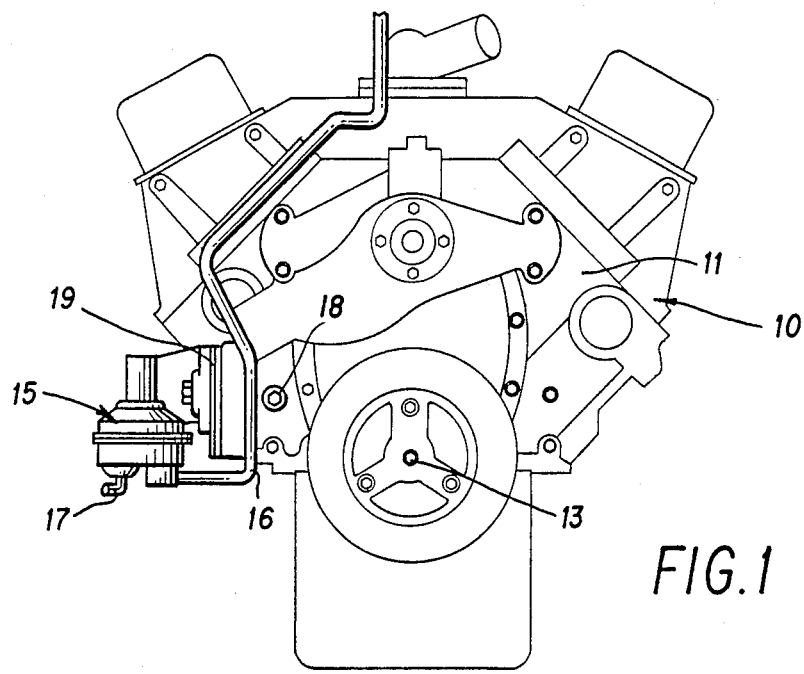
FIG. 1 is a front elevation of a General Motors V-8 gasoline engine of the type to which the present invention is applicable.
Figure 2:
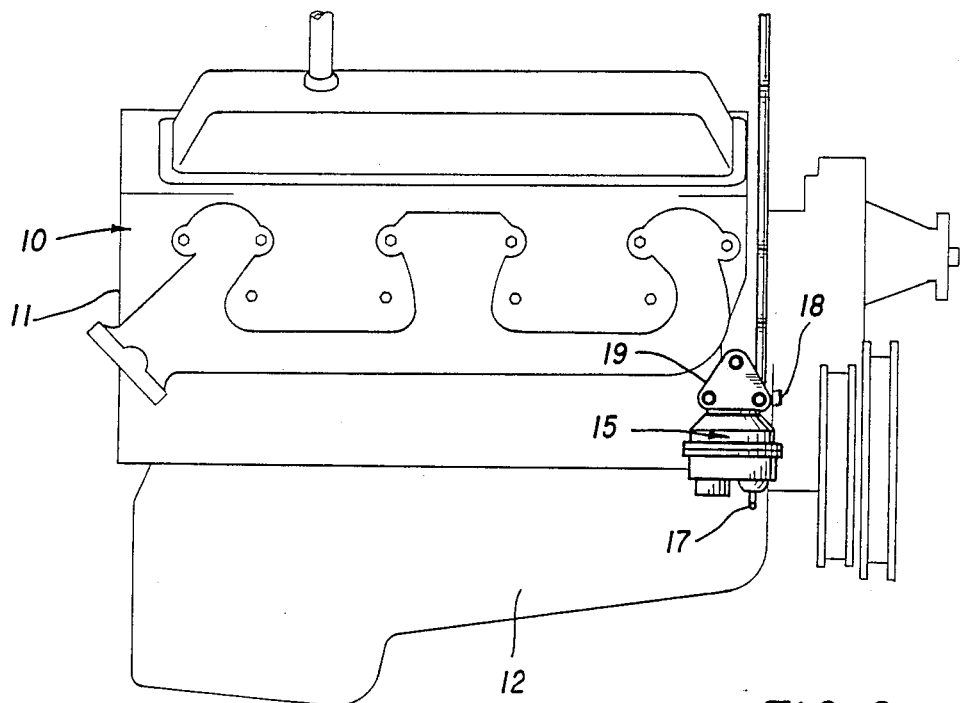
FIG. 2 is a side elevation of the engine shown in FIG. 1.

Referring to the drawings in detail wherein like numerals designate like parts, a typical General Motors V-8 gasoline engine 10 is illustrated in the drawings having a block 11, an oil pan 12, a crank shaft 13 and cam shaft 14. V-8 engines of this type have been manufactured on a production basis from 1955 to the present date.

In the regular maintenance of the engines, it may become necessary to remove the fuel pump 15 and replace it with a new or rebuilt pump. In doing this, the mechanic will normally remove the engine air filter and disconnect the fuel line 16 at the carburetor and then disconnect the fuel line at the pump 15. The fuel inlet line 17 is also disconnected at the fuel pump and suitably plugged. Some engines have a return fuel line to the fuel tank, in which case this line is also disconnected and plugged prior to removing the fuel pump 15 and installing a new fuel pump.

An existing bolt 18 is engaged in a threaded opening of the engine block 11 approximately two inches laterally inwardly of the fuel pump mounting face 19, FIG. 1. This bolt 18 is a ⅜th inch bolt having a length of ⅞th inch. The bolt 18 conveniently is in alignment with the fuel pump push rod 20 which is operatively connected to the engine cam shaft 14, FIG. 3. When the fuel pump 15 is installed, its fuel pump arm 21 must be engaged by the push rod 20 in the manner shown in FIG. 3 if the fuel pump is to operate. If the push rod 20 is allowed to fall during the pump installation procedure, it cannot thereafter engage the fuel pump arm 21 and therefore the fuel pump will not operate. This problem has given rise to the haphazard and sometimes unsuccessful prior art schemes of holding up the arm with a screwdriver or some homemade implement by inserting the implement between the engine block and fuel pump while the pump is being installed and withdrawing the implement after the pump arm 12 has engaged the push rod 20. These procedures do not always work satisfactorily, in which case the pump has to be reinstalled. Considerable time and expense can be involved plus a lot of inconvenience on the part of the mechanic.

Figure 3:
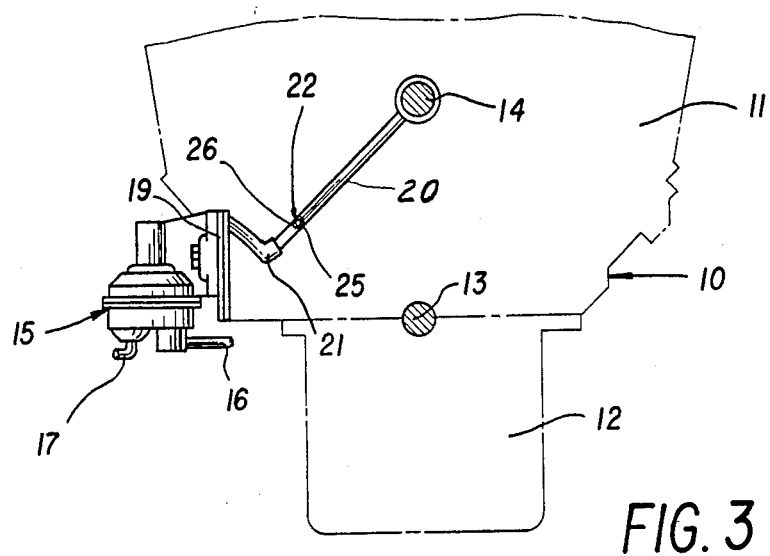
FIG. 3 is a vertical section taken through the engine, partly in elevation, showing the operative relationship of the fuel pump push rod and fuel pump arm.
Figure 4:
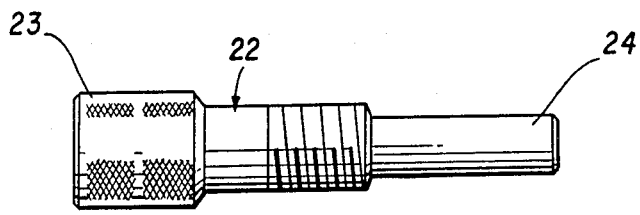
FIG. 4 is a side elevation of a push rod holding screw forming the essence of the present invention.

In accordance with the essence of the present invention, the existing bolt 18 is temporarily removed from its threaded opening in the block 11 prior to the removal of the defective pump 15 and while the push rod 20 is properly engaged with the pump arm 21. A special push rod holding screw 22 according to the present invention is then installed in the threaded opening of the block previously occupied by the bolt 18. The holding screw 22 of course has the same thread size as the threaded opening in the block, namely, ⅜th inch USS threads. As shown in FIG. 4, the holding screw 22 preferably has a manual turning head 23 to facilitate turning with the fingers and has a forward cylindrical extension 24 preferably ¼th inch in diameter and about ⅜th inch in length. The overall length of the turning screw can be 2 5/16th inches and the length from the turning head 23 to the tip of the extension 24 is approximately 1¾th inches. With these dimensions, the holding screw 22 is adequately long to allow its forward extension 24 to solidly contact one side of the push rod 20 at the point 25 shown in FIG. 3 which corresponds to the axis of the existing bolt 18 and the threaded opening in the block receiving this bolt and also receiving the push rod holding screw 22.

As previously noted, the holding screw 22 is simply turned manually until its forward tip contacts the push rod 20 which weighs only about five ounces and is about 5¾th inches long with a diameter of about ½ inch. Relatively light pressure exerted on the push rod 20 by the holding screw 22 is sufficient to hold the push rod 20 elevated to the proper use position shown in FIG. 3 while the defective fuel pump 15 is removed and a new pump is installed. The fuel pump arm 21 of the new pump will properly engage the push rod 20 as shown in FIG. 3, and after the installation is completed, the holding screw 22 is simply removed from the engine block and the regular bolt 12 is reinserted in the threaded opening of the block, which opening is indicated by the numeral 26 in FIG. 3. The bolt 12 is merely a plug for the threaded opening and does not contact push rod 20.

It may be seen that the present invention provides a simplified, convenient and highly reliable precision device and method for installing a V-8 engine fuel pump with the certain knowledge that the fuel pump push rod 20 will properly engage the fuel pump arm 21 of the installed pump. The makeshift arrangements and inconvenience of the prior art are entirely eliminated and no structural alteration of the engine or fuel pump is required.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of replacing a fuel pump on an engine having a cam-operated fuel pump push rod and having a bolt engaged within a threaded opening in one end of the engine whose axis is aligned with said push rod and across the axis of the push rod when the push rod is in its proper operating position relative to a fuel pump arm, the method comprising the steps of removing said engine bolt from said threaded opening, installing in said threaded opening a push rod holding screw of sufficient length to contact the push rod, turning said holding screw in the threaded opening until the forward end of the holding screw engages the push rod and exerts holding pressure thereon, removing the existing fuel pump from the engine, installing a new fuel pump thereon with the arm of said pump properly engaging said push rod being held by the holding screw, removing the holding screw from said threaded opening, and reinstalling said bolt therein.

2. A method of installing a fuel pump on a V-8 automotive engine comprising the steps of removing an existing bolt from a threaded opening in the block of the engine having its axis aligned with a fuel pump push rod, installing in said threaded opening a push rod holding screw and turning said screw until its forward end engages the push rod and exerts holding pressure thereon, installing a fuel pump on the engine with the operating arm of said pump properly engaged with the push rod while the push rod is being held against movement by said holding screw, removing the holding screw from said threaded opening, and reinstalling said bolt in the threaded opening.

* * * * *